(12) United States Patent
Davallou

(10) Patent No.: US 7,716,235 B2
(45) Date of Patent: *May 11, 2010

(54) PHONETIC SELF-IMPROVING SEARCH ENGINE

(75) Inventor: Arash Michael Davallou, Encino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/282,429

(22) Filed: Nov. 18, 2005

(65) Prior Publication Data

US 2006/0074892 A1   Apr. 6, 2006

Related U.S. Application Data

(63) Continuation-in-part of application No. 10/126,320, filed on Apr. 19, 2002, now Pat. No. 6,976,019.

(60) Provisional application No. 60/285,083, filed on Apr. 20, 2001.

(51) Int. Cl.
    *G06F 7/00*    (2006.01)
    *G06F 17/00*   (2006.01)
(52) U.S. Cl. ........................ 707/766; 707/759
(58) Field of Classification Search ............ 250/201.9; 375/285
    See application file for complete search history.

(56) References Cited

U.S. PATENT DOCUMENTS

| | | | |
|---|---|---|---|
| 6,173,279 B1 * | 1/2001 | Levin et al. | 707/5 |
| 6,188,984 B1 * | 2/2001 | Manwaring et al. | 704/260 |
| 6,647,383 B1 * | 11/2003 | August et al. | 707/3 |
| 6,728,761 B2 * | 4/2004 | Decime | 709/217 |

* cited by examiner

*Primary Examiner*—Apu M Mofiz
*Assistant Examiner*—Susan Y Chen
(74) *Attorney, Agent, or Firm*—Hickman Palermo Truong & Becker LLP

(57) ABSTRACT

The present invention relates to phonetic self-improving search engines. The search engine may include a phonetic database having a plurality of phonetic equivalent formulas stored therein, each of the phonetic equivalent formulas being associated with at least one respective pronounceable unit. After an initial query in a primary database fails to produce a positive result, an error memory database may be queried with a search string to obtain a positive result based on records of previously failed searches which ultimately found a positive result. If no record is found, the search string may be parsed into at least one pronounceable unit. Phonetically equivalent formulas may be applied to the at least one pronounceable unit to create at least one phonetic search string which is re-queried into the error memory database and the primary database. Successful positive results may be stored with the search string in the error memory database.

23 Claims, 5 Drawing Sheets

PHONETIC SELF-IMPROVING SEARCH ENGINE

PRIORITY CLAIM

The present application is a Continuation-in-Part application, claiming the benefit of priority of U.S. patent application Ser. No. 10/126,320, entitled, "PHONETIC SELF-IMPROVING SEARCH ENGINE," filed Apr. 19, 2002, now U.S. Pat. No. 6,976,019 which claims the benefit of priority of U.S. Provisional Application No. 60/285,083, entitled, "PHONETIC SELF-IMPROVING SEARCH ENGINE," filed Apr. 20, 2001, the entirety of which are expressly incorporated herein by reference.

BACKGROUND OF THE INVENTION (1) Field of Invention

The present invention relates to a search engine, and more particularly to self-improving phonetic search engines for use in databases, web browsers and the like.

(2) Description of Related Art

Conventional search engines (or browsers) that perform searches on the web, whether they be search engines within a company website helping clients look for products and services, database searches within call centers, or general search engines for the world wide web (Internet), generally perform the search task using a text matching process. Users enter keywords within designated search fields and the text matching process begins.

This process is generally not the most accurate or convenient way to search for data, partially because the user may make spelling mistakes while typing in the search field, or s/he may not know the precise spelling of a proper noun that may have various different spelling formats (i.e. "Fich" and "Fish" both pronounced "Fish" or "Jo" and "Joe"). This results in frustration as the user may not be referred to the site/information that s/he intended and s/he must then restart the search attempting a different spelling or set of words.

As an illustrative example, typically in website searching, the user may enter a search string which is then compared with the database of registered URLs. If an accurate match is found, the user is directed to the respective website associated with the registered URL. If no accurate match is found, the web-browser typically returns an error message indicating that no match has been found, whereby the user must then reenter a different search string by experimenting with various spelling combinations.

Phonetic string matching has been developed in the past to address the problem of spelling in search queries. However, current systems codify both the primary database and the search string to attempt to match the two when the text-based search does not reveal any results. The problem with this approach is that it assumes the primary database to not change constantly, and if changed, to do so with aid of a coding agent that would include application specific phonetic tags onto primary records to be used for future queries within a closed database system. When the primary database becomes as large and open as the world wide web with constantly changing data and no universal application to tag all primary records for an application-specific phonetic matching process, then there arises a need to address potential misspellings in search queries in a more efficient manner.

Some technologies have recently been introduced that utilize matched and un-matched terms within a search string that consists of more than one word to correct the spelling of the un-matched term and help direct a user automatically to what s/he may have been looking for (please see referenced U.S. Pat. No. 6,144,958). However, these technologies are not helpful when the un-matched term is only one word.

Accordingly, there is a need for improving the current methodologies employed in search engines.

SUMMARY OF INVENTION

The present invention relates to a method of providing a user with a positive search result by querying a database system. The method comprises the acts of:
- (A) creating and/or utilizing a phonetic database having a plurality of phonetically equivalent formulas stored therein, each of the phonetically equivalent formulas being associated with at least one respective pronounceable unit;
- (B) receiving a search string from the user;
- (C) querying a primary database with the search string, the primary database having a plurality of primary records stored therein;
- (D) if the search string exists in the primary database:
  - (1) identifying a respective one of the primary records which matches the search string in the primary database as the positive search result; and
- (E) if the search string does not exist in the primary database:
  - (1) parsing the search string into at least one pronounceable unit;
  - (2) applying the phonetically equivalent formulas to the at least one pronounceable unit for outputting at least one phonetic search string;
  - (3) comparing the at least one phonetic search string with the primary records;
  - (4) if the at least one phonetic search string exists in the primary database: and
    - (a) identifying at least one result candidate which matches the at least one phonetic search string in the primary database as the positive search result.

In another aspect, the method further comprises an act of utilizing an error memory database such that if the search string does not exist in the primary database, the method further comprises acts of:
- (1) querying an error memory database with the search string, the error memory database having a plurality of error memory records, each of the error memory records having at least one positive search result and at least one search string associated therewith;
- (2) if the search string exists in the error memory database:
  - (a) identifying a respective one of the error memory records which matches the search string in the error memory database as the positive search result; and
- (3) if the search string does not exist in the error memory database:
  - (a) parsing the search string into at least one pronounceable unit;
  - (b) applying the phonetically equivalent formulas to the at least one pronounceable unit for outputting at least one phonetic search string;
  - (c) comparing the at least one phonetic search string with the primary records and the error memory records;
  - (d) if the at least one phonetic search string exists in the primary database:
    - (i) identifying at least one result candidate which matches the at least one phonetic search string in the primary database as the positive search result;

(e) if the at least one phonetic search string exists in the error memory database:
  (i) identifying at least one result candidate which matches the at least one phonetic search string in the error memory database as the positive search result;
(f) if the positive search result is confirmed by the user: and
  (i) storing the search string, a confirmed phonetic search string and the positive search result in the error memory database as an error memory record.

In another aspect, the primary database is the Internet, the search string is a word or phrase within a web-page, and the search result is a link to the web-page that includes a phonetic equivalent to the search string.

In yet another aspect, a phonetic equivalent to the search string is included in the web page. A query to the user is included proximate the search string to determine whether the phonetic equivalent is the search string intended by the user.

In another aspect, if a positive search result is generated in act (E), the system will query the user with a suggested spelling and provide the correctly spelled search string as the suggested spelling.

Additionally, the primary database is selected from a group consisting of a personal contact system or a networked contact system and the search string is created as an attempt to match a word or phrase within the primary database. The search result is contact information located in a the primary database that is a phonetic equivalent to the search string.

Furthermore, when the primary database is a networked data system, the error memory database of each user is updated based on data received from all other users on the network.

In another aspect, the primary database is an e-mail database and the search string is created as an attempt to match a word or phrase within the e-mail database. In this aspect, the search result is a word or phrase within the e-mail database that is a phonetic equivalent to the search string.

In yet another aspect, the primary database comprises products with product names/descriptions on an Internet-accessible database. The search string is created as an attempt to match a word or phrase within the product name/description, and the search result is a product within the Internet-accessible database that is a phonetic equivalent to the search string.

Furthermore, if a positive search result is generated in act (E), the system will query the user with a suggested spelling and provide the correctly spelled product name as the suggested spelling.

In another aspect, the primary database is the Internet, the search string is an attempt to match a portion of a uniform resource locator (URL), and the search result is a link comprising a URL containing a phonetic equivalent to the search string.

In yet another aspect, the search string is generated through a speech-to-text software application from the dictation of a user through a telephone system interacting with a database.

In yet another aspect, the primary database is an information directory.

Additionally, the primary database is a set of computer files, the search string is an attempt to match a word or phrase about or within a computer file, and the search result is a link to the computer file that includes a phonetic equivalent to the search string. The computer files are selected from a group consisting of multimedia files and music files.

Finally, as can be appreciated by one in the art, the present invention also comprises a method for forming and using the self-improving search engine described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a search engine, and more particularly to self-improving phonetic search engines for use in databases, web browsers and the like. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Description

Figure 1:
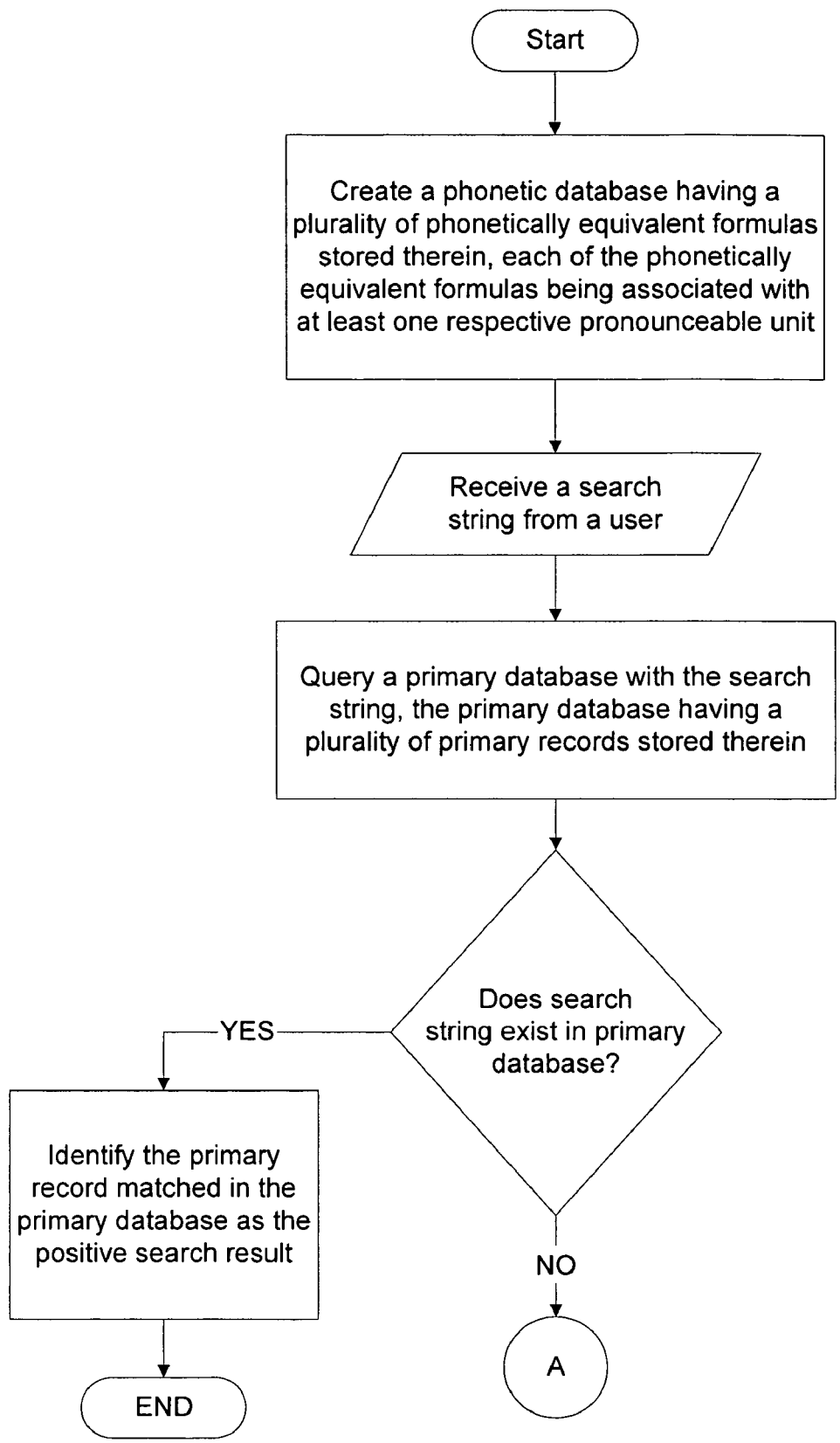
FIGS. 1-5 are flow chart diagrams illustrating the method according to the present invention.
Figure 2:
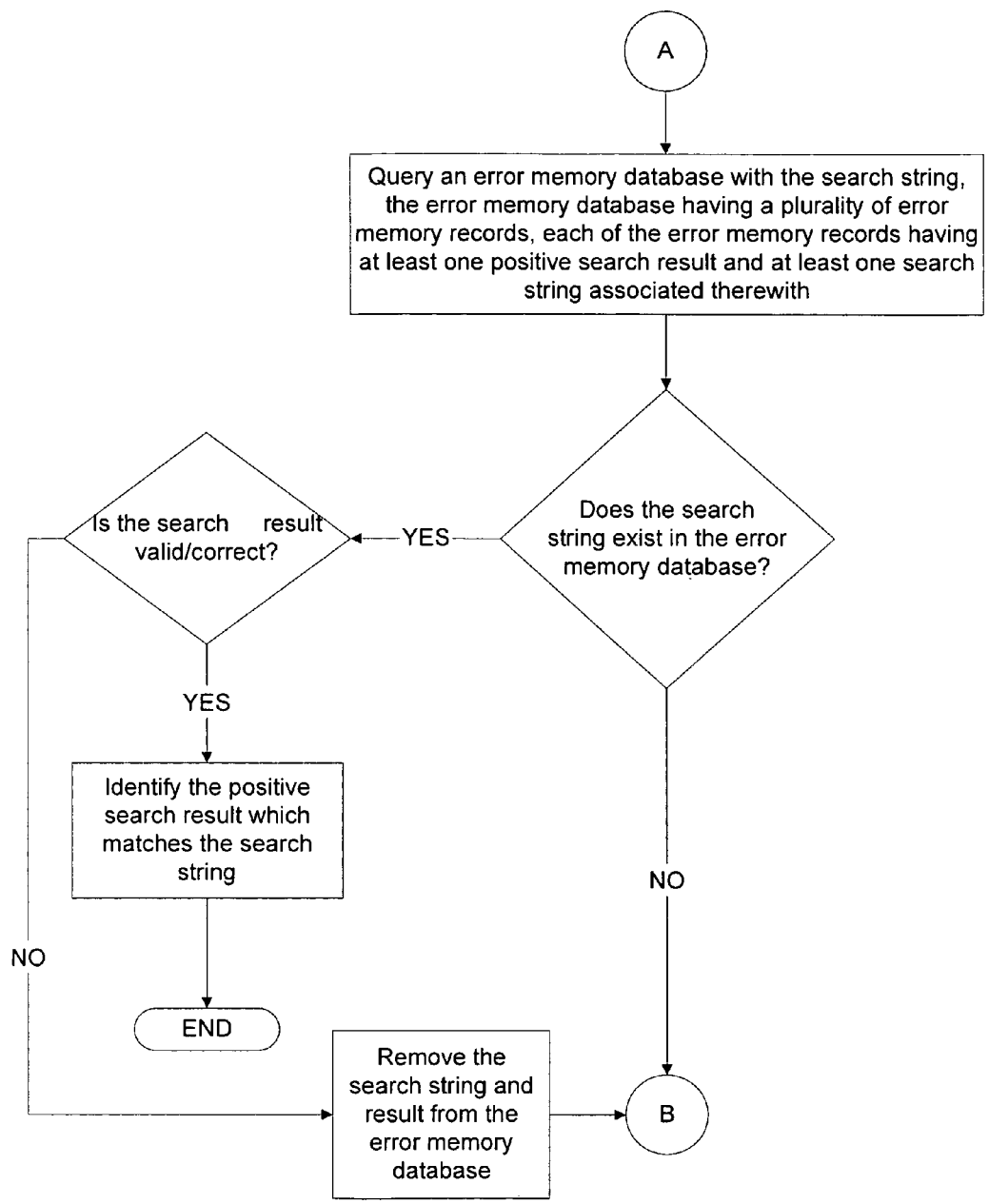
Figure 3:
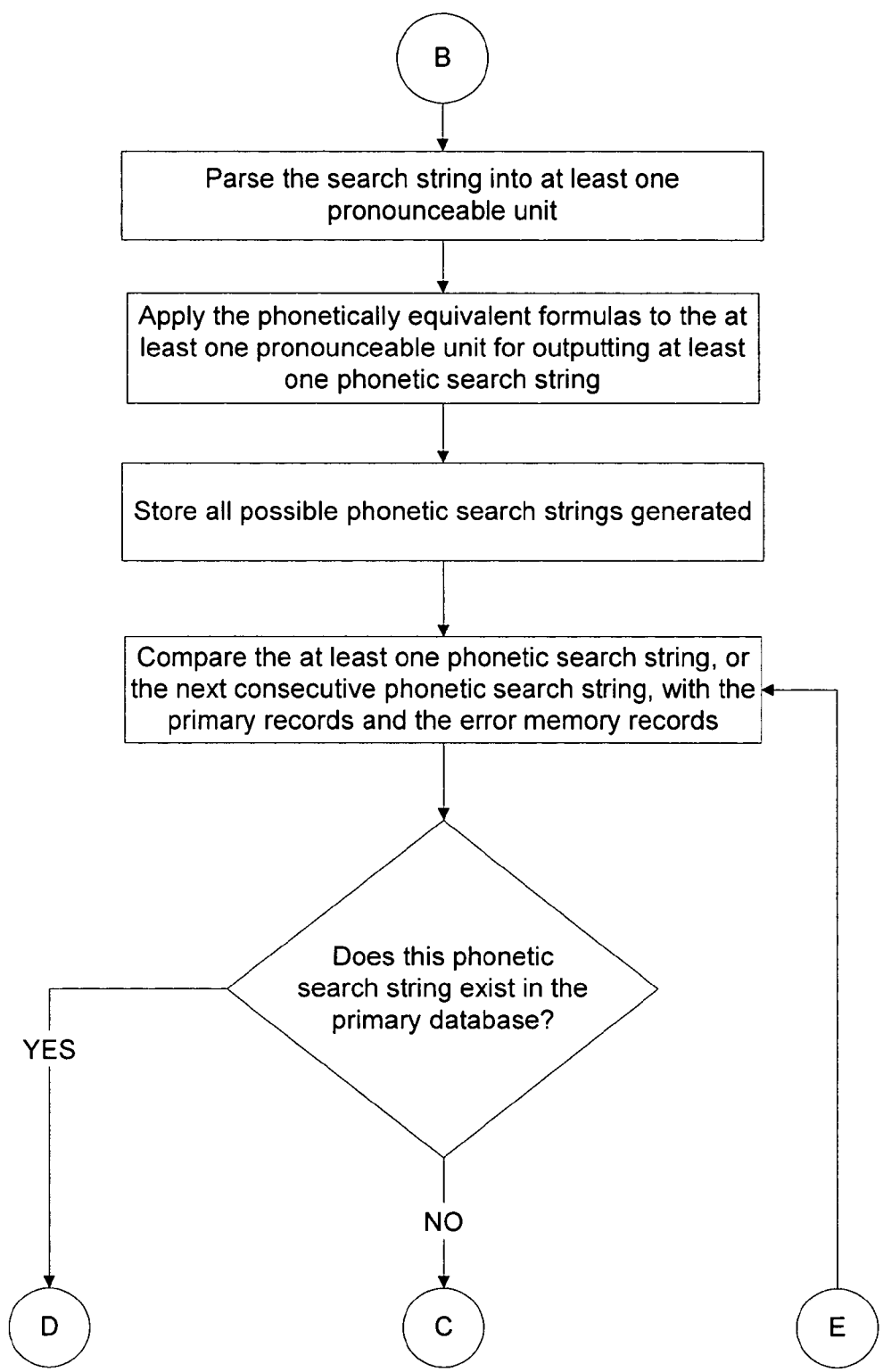
Figure 4:
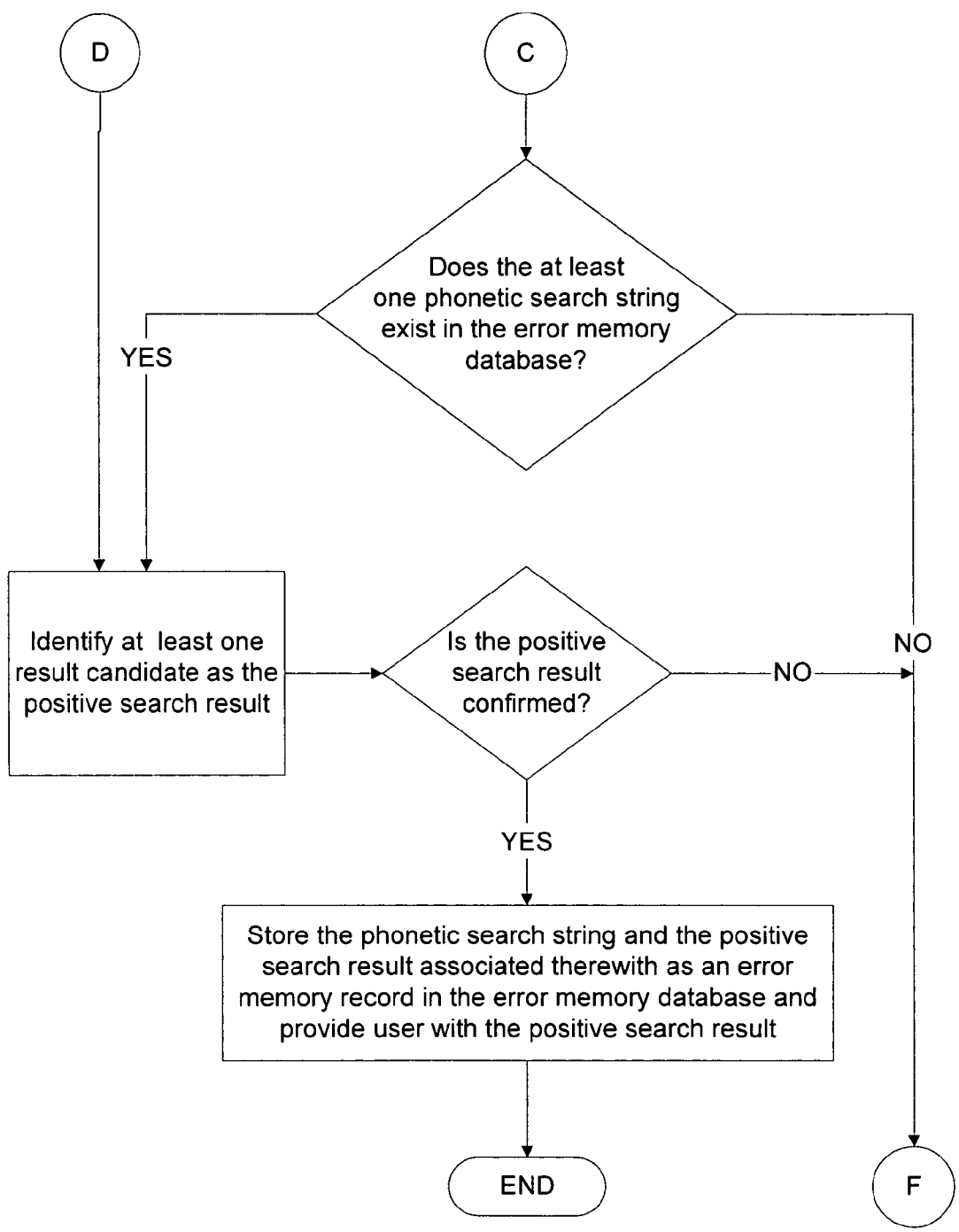
Figure 5:
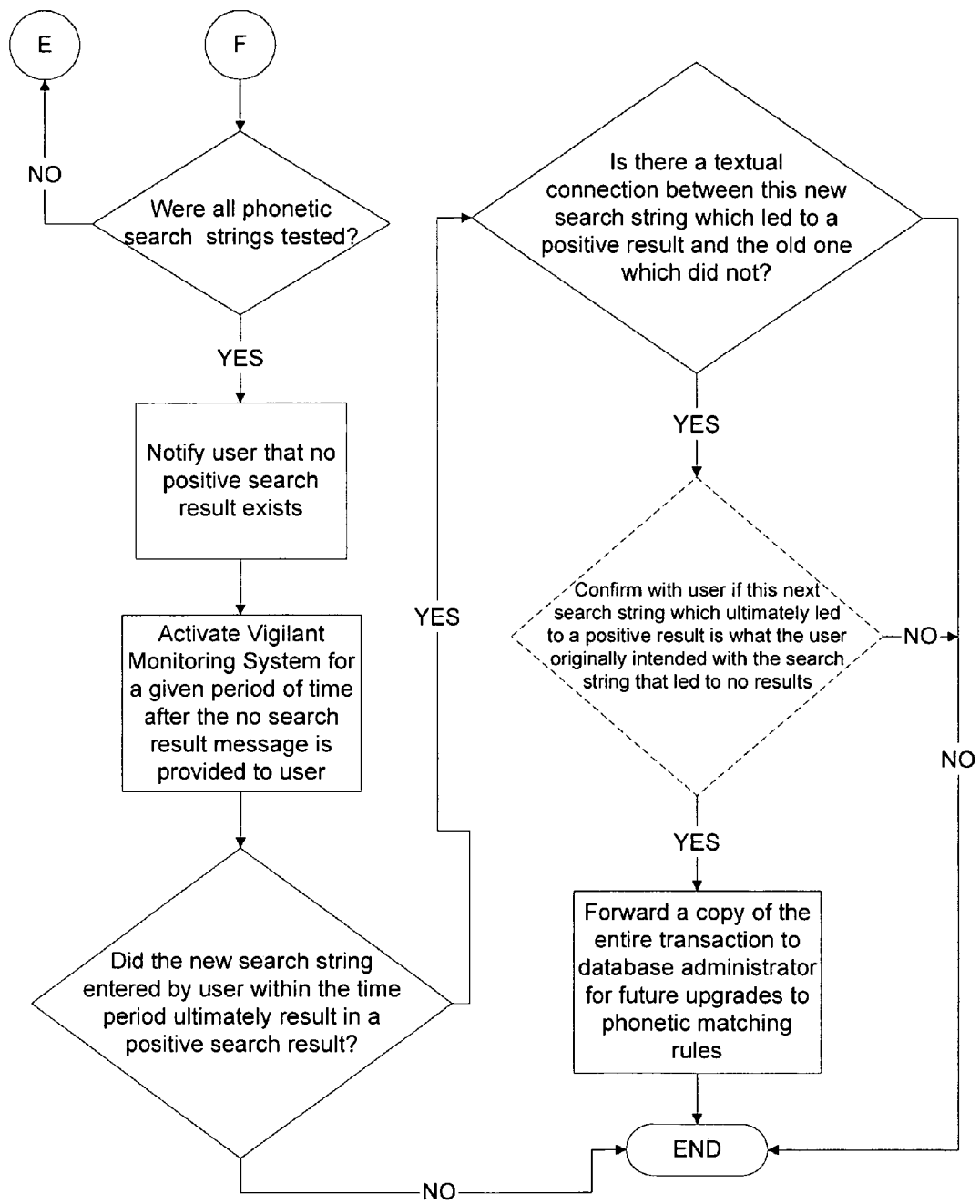

Referring now to the drawings, the drawings are provided to illustrate an aspect of the present invention and are not intended to limit the invention thereto. FIGS. 1-5 illustrate the method of providing a user with a positive search result by querying a database system. In accordance with the present invention, the self-improving phonetic search engine invention is a software engine which may be integrated with current search engine software or can be bundled with its own text-based search software. This software uses a search method which alleviates the problem of misspelled text (especially proper nouns) by performing a phonetic-based search in addition to the traditional text-based search to increase the accuracy of the result. In this respect, if a user is looking for a particular keyword/web site, and the keyword/s s/he enters does/do not match any data existent on the database/web, the engine would perform a second search with words that best match the sounds of the typed word/s in the user's language (or various languages) to see if a more accurate match can be found in the database/web. This system helps the user to more accurately pinpoint the data that s/he may be looking for without the need to retype the search request various times with alternate spellings. For proper nouns it alleviates the problem of having to retype the information with different spellings, and for normal words, if not spelled correctly, it can assist in pin pointing the information requested utilizing a correct spelling associated with the sound of the word entered.

One exemplary methodology is as follows. The keyword/s that is/are entered, first goes/go through a text-matching search process for the fastest match in a primary database. The primary database is any suitable database, several non-limiting examples of which follow. For example, the primary database is an information directory, a personal contact system, a networked contact system (i.e., networked data system), or the Internet.

When the primary database is a networked data system, the error memory database of each user is updated based on data received from all other users on the network.

In another aspect, the primary database is an e-mail database and the search string is created as an attempt to match a word or phrase within the e-mail database. The search result in such an aspect is a word or phrase within the e-mail database that is a phonetic equivalent to the search string.

In yet another aspect, the primary database comprises products with product names/descriptions on an Internet-accessible database. In this aspect, the search string is created as an attempt to match a word or phrase within the product name/description, and the search result is a product within the Internet-accessible database that is a phonetic equivalent to the search string. If a positive search result is generated, the system will query the user with a suggested spelling and provide the correctly spelled product name as the suggested spelling.

In another aspect, when the primary database is the Internet, the search string is an attempt to match a portion of a uniform resource locator (URL), and the search result is a link comprising a URL containing a phonetic equivalent to the search string.

In another aspect, the primary database is a set of computer files. The search string is an attempt to match a word or phrase about or within a computer file, and the search result is a link to the computer file that includes a phonetic equivalent to the search string. The computer files are any files capable of being stored on a computer, non-limiting examples of which include multimedia files and music files.

As applicable above, if an accurate match is found, the matching text is identified and communicated to the user. If an accurate match containing the word/s is not found, then a query may be performed in an error memory database. The error memory database contains a plurality of error memory records which contain data of previous searches where at least one positive search result was found in association with at least one search string. The search string is a word or phrase within a web-page, and the search result is a link to the web-page that includes a phonetic equivalent to the search string. In another aspect, the search string is created as an attempt to match a word or phrase within the primary database, and the search result is contact information located in a the primary database that is a phonetic equivalent to the search string. When a phonetic equivalent to the search string is included in the web page, a query to the user is included proximate the search string to determine whether the phonetic equivalent is the search string intended by the user. In another aspect, the search string is generated through a speech-to-text software application from the dictation of a user interacting with a database, such as through a telephone system or microphone.

Thus the error memory database stores a history of prior erroneous/misspelled queries and their corresponding correctly spelled search strings leading to results. Advantageously, by providing such an error memory database, the future entry of the same search string with an incorrect spelling would be found and the user will be provided with a result more expeditiously. In this respect the search engine is self-improving. The error memory database may communicate to the user that the previous user who entered that particular search string found a positive result with: (and present the correctly spelled string) or simply present the correctly spelled string and ask the user if that is what s/he meant to enter in the search field. Hence, this system leverages mistakes made by previous users to help expedite the searching activities of future users.

If, however, the error memory database were to have no record of the search string entered by the user, the phonetic based search begins which would simultaneously compare and contrast words and sounds of what was entered as the search string and that which exists on the web/database. Such phonetic searching may be accomplished by initially providing a phonetic database which contains a set of phonetically equivalent formulas. In this respect, the phonetically equivalent formulas equate commonly mispronounced pronounceable units, including vowels, consonants, and other letter combinations, with pronounceable units. By way of example, one phonetically equivalent formula may be: "B=V" or another formula may be "OO=OU".

A plurality of these formulas may be pre-entered into a phonetic database to be utilized by the present invention during the search process. Alternatively, the formulas may be retrieved from another database source. It is not crucial that the phonetic database reside on the same system/server as the database system, however the phonetic database may be a dataset which is a relational dataset linked to the database system.

Furthermore, where multiple potential result candidates are displayed or communicated to the user, they are preferably communicated in an array. To facilitate a more simplistic way of sorting through the data array, such an array may be sorted alphabetically or in order of relevance. Optionally, the array may be selectably adjustable by a variable accuracy factor. The accuracy factor may or may not be available to change by the end-user, however, it can be controlled by the administrator of the search engine and the phonetic search may follow the text search or work in unison with it. The term "accuracy factor" here refers to how closely the search results resemble the original query. 100% accuracy is when all of the texts found match precisely the text entered in the order in which the text was entered. Less accurate results provide only partial matches or matches for the same text but in a different order. Additionally, the accuracy factor may rely upon the database system's previous search history and records of positive results found by previous users. In this respect, such positive results would be listed first where the accuracy factor is increased.

To better illustrate the functionality of the present invention, an example is provided below. If the search string desired by the user is "Fich and Richardson Flower Shop,"

there are numerous interpretations to such a phrase. If one were to hear the phrase from a friend and enter "Fish and Richardson Flower Shop" on any of numerous Internet search engines, the results might not match the actual site. Unfortunately, the user must then retype the search string entered and try again by using a different combination of words/spellings. The present invention could recognize the lack of accuracy and perform a phonetic search based on the sounds of the words entered and through that system pinpoint the correct web address. In this case, after recognizing an inaccurate match for the words typed, the system will analyze each word entered and search for similar sounding words within the phonetic database and generate a number of different combinations based on the approximate pronunciation of the text entered and the phonetically equivalent formulas. This engine considers all possible combinations of matches until the highest degree of accuracy is achieved for the query. For example, if the phonetically equivalent rule "CH=SH" were applied, at least one phonetic search string would result. Some examples of such phonetic search strings include: "Fish and Rishardson Flower Chop," "Fich and Rishardson Flower Shop," etc. This system may eventually find the "Fich and Richardson Flower Shop" even though the original entry involved a different spelling, without the user having to respell or retype the entry.

This novel system can also be used for 411 information call centers. For example, if a user wished to obtain the information for the surname "Davallou," the user might contact 411 and vocally or otherwise audibly communicate the surname over the phone to the operator. This surname is sometimes misheard over the phone as "Baballoo", which does not retrieve any information. As the letters D, V and B may sound the same over the phone, this is an issue and callers are forced to spell the name wanted letter by letter, and sometimes the spelling may not be correct as they may have simply heard the name from a friend. The presented invention will compare and contrast what has been entered to a phonetic database and facilitate the search process by matching the closest sounding word to that which was entered. In this respect, when "Baballoo" is entered, the system recognizing that the letters B, D and V may have been misheard via the phonetically equivalent formulas or other means of recognizing commonly misspelled pronounceable units, will perform a comprehensive search for all other possibilities before stating "no match found." This would include in this case a change in the last part of the word entered to "ou" from "oo" to account for the possible similarity in sound. This process facilitates the search process and saves time for both the operator and the client. The aforementioned example is only one of many possible examples. There are many other letters and letter combinations, or pronounceable units, which may sound alike which this novel system recognizes.

Another scenario in which this may become useful would be within the context of a web browser. Contemporary web browsers incorporate technology where when a user enters a website URL (Uniform Resource Locator) that does not exist, the user receives an error from the system indicating that no such URL exists. This is because typically, the URL address must be exact to retrieve the proper website address. However, this novel system can direct users to the most similar sounding website URL addresses which actually exist and provide users with the ability to choose among them rather than encounter an error which requires the user to make further attempts by retyping the URL address. This novel process of phonetic based searching is designed to make search engines or web browsers more sensitive to human error and to enhance their accuracy through time.

To improve the searchability of Internet Websites, the present invention further provides a method of directing a user to an Internet Website address. This method is substantially the same as described herein with reference to general databases yet additionally directs the user to the specific Internet Website address. The method includes creating a phonetic database having a plurality of phonetically equivalent formulas being associated with at least one respective pronounceable unit. Next, a search string may be received from the user. Subsequently, a registered URL database may be queried with the search string. As used herein, registered URL database refers to Internet databases storing locations and data for directing web surfers to the proper Internet Website. More specifically, text-based Internet Website addresses and their respective IP address are stored in at least one database accessible on the Internet. Each IP address should correspond to the location of a respective server storing webpage data. Preferably, the primary record database is the registered URL database. However, the registered URL database shall include other databases including global computer network address information accessible from the global computer network by users for locating specific data pages, i.e. Internet Websites. If the registered URL database includes a URL record matching the search string, the matching URL record is identified as the Internet Website address to the user. Preferably, the user is then directed to the Internet Website address.

If, however, the search string is not found in the registered URL database, the method proceeds to query a URL error memory database with the search string. As used herein, the URL error memory database is substantially the same as the error memory database described herein yet is specifically oriented to store URL-specific error memory data. The URL error memory database includes a plurality of URL error memory records and each of these URL error memory records has at least one Internet Website address and at least one search string associated therewith. If the search string does exist in the URL error memory database, a respective one of the URL error memory records matching the search string is identified as the Internet Website address. The user is then either suggested the Internet Website address as an alternative to what they typed, or is directed to it and notified that the original search string led to no results and that this new website is the closest match.

As a final act, if the search string does not exist in the URL error memory database, the phonetic searching process commences. Desirably, the search string is parsed into at least one pronounceable unit, as previously described herein. Phonetically equivalent formulas, whether predetermined or created by the system, may be applied to the at least one pronounceable unit for outputting at least one phonetic search string. These phonetic search string(s) are compared with the URL records and the URL error memory records. If it is determined that the phonetic search string(s) exists in the registered URL database, at least one result candidate which matches the phonetic search string(s) is identified as the Internet Website address. Similarly, if the at least one phonetic search string exists in the URL error memory database, at least one result candidate which matches the at least one phonetic search string is identified as the Internet Website address. The Internet Website address may then be confirmed by the user. If such confirmation is determined, whether manually or automatically via monitoring of user behavior, a confirmed phonetic search string is defined. The search string, the confirmed phonetic search string, and the Internet Website address are stored in the URL error memory database as an URL error memory record. If a positive search result is generated, the system will query the user with a suggested spelling and provide the correctly spelled search string as the suggested spelling.

Because this invention involves improving the searchability of data within enterprise databases or the World Wide Web and making it more accommodating to human error, there is provided a system that remembers prior errors and builds an error memory database to improve searchability of data for future users, in case the same error is made as previous users. For example, with the surname and search string "Davallou," if a user misspells the name when initially entering the search string and enters, "Baballoo," the system will first do a search to see if "Baballoo" exists in the primary database. If "Baballoo" does not exist in the primary database or the error memory database, then the phonetic engine begins making alternate synthetic words that sound the same and tests them within the primary database, and "Davallou" may be presented to the end user as the closest match. After the user has had a chance to explore "Davallou," the system will confirm the error memory link between "Baballoo" and "Davallou" by either asking the user if "Davallou" was the correct match, or implying this by monitoring user behavior.

The next time around that a user makes the same mistake of typing "Baballoo" and such a string does not result in matches in the primary database, then the error memory link associating "Baballoo" and "Davallou" will be confirmed by testing to see if "Davallou" is still a valid string with a valid result in the primary database, and then "Davallou" is presented to the end user as a suggested match for what the user may have been looking for. This way a phonetic search process may not have to be conducted when the same spelling error is repeated in the future.

The user affirmation of a phonetic search string's validity can be ascertained by having the user click on a button that asks if this was the correct match for the data that they entered, or the system can monitor the user's behavior to the data presented to reach that conclusion. For example if a user clicks on "Davallou" and remains on the website for a designated period of time or clicks through the site to explore the site that "Davallou" was found on, then this may imply a positive correlation and the system will record a confirmation in the error memory database. In this respect, the system fine-tunes itself to the most common human errors through time and is able to deliver the fastest access to the content that a user is looking for without the user having to reenter the spelling of the search string.

Inaccurate search results or text that generated no results preferably goes through the following process. The primary database is queried with the search string to determine if an exact match exists. If no match exists, the search string is compared with the error memory database to determine if such a search string has been queried before. If the error memory database ascertains that it has been queried before by another user, the previously affirmed match is verified to determine if it is still valid on the system. If the data is still valid than that data/site is suggested as a possible match for what the new user is looking for. The user at this point may choose to accept the result or ask to conduct a more through phonetic search. If the error memory database affirms that this is a novel query, then the phonetic search process is initiated.

Text-to-sound estimation for each word entered may be conducted (this can and sometimes may involve the use of a text-to-speech and/or speech-to-text application, i.e. voice recognition applications which include computer software which receives audible signals and converts such signals into text). In this respect, possible different spellings for each word entered are generated as a result by parsing the search term into pronounceable units and applying the phonetically equivalent formulas to create at least one phonetic search string. All possible spelling combinations of each word entered are matched with all spelling combinations of other words entered and all possibilities are checked against the database of existing data/the World Wide Web (the primary database) and the error memory database. The most accurate matches may be presented to the user in order of accuracy.

The data that the user ascertains to be a good match for the original text entered is recorded as an error memory record in the error memory database for future reference. The ascertainment of a positive result can be literal, whereby the user is prompted to answer if the suggested data matched their original intentions or the system can decipher that based on the user's behavior and his/her interaction with the data retrieved. Optionally, the user may be prompted with a query as to whether the phonetic search string is the correct match. If the user indicates that there is an incorrect match, then the link between that phonetic string and the original query may be deleted from the error memory database.

Additionally, further improvements may be made which enhance the functionality of the novel method according to the present invention. Optionally, a Vigilant Monitoring System that seamlessly monitors what users retype after not receiving any accurate responses to their original query may be provided. Based on what users retype and the results they get from that modified entry and how much time they spend on the results (or their positive response to a question asking if what they are currently looking at is what they intended to look for based on their original query which led to no results), new phonetically equivalent formulas may be developed within the system to make it more refined and better equipped to deal with common human errors in the future. In this respect, if no positive search result is found to exist after exhausting all possibilities of phonetic search strings, the Vigilant Monitoring System may be activated for a given period of time. If the next search string entered by the user within the time period ultimately results in a positive search result, it is then determined whether there is a textual correlation between this new inquiry which led to a result and the old one which did not. A textual correlation is determined utilizing the accuracy factor. Optionally, the user may be queried to confirm if the next search string which ultimately led to a result is what the user originally intended with the string that led to no results.

Finally, a copy of the entire transaction is forwarded to a database administrator for future upgrades to phonetic matching rules. Optionally, the system may create its own phonetic formulas based on the phonetic link identified by comparing the new inquiry and the initial inquiry.

Additionally, a common dictionary-based spell check system may be employed and integrated within the system to further add a layer of accuracy to the results suggested and delivered to the end-user based on the end-user's language of preference. This may facilitate accurate suggestions made when the lack of search results is not due to misspellings of proper nouns (with various possible spellings), but rather due to misspellings of regular words within a language's given dictionary. Such a spell check system may be provided as an initial act in the novel method of the present invention.

Additional modifications and improvements of the present invention may also be apparent to those of ordinary skill in the art. Thus, the particular combination of parts described and illustrated herein is not intended to serve as limitations of alternative devices within the spirit and scope of the invention.

What is claimed is:

1. A computer-implemented method for addressing spelling errors comprising:

establishing a phonetic database having a plurality of phonetically equivalent formulas stored therein, each of the phonetically equivalent formulas being associated with at least one respective pronounceable unit;

receiving an initial search string from a user through a search interface;

wherein the initial search string is in a particular language of the user's preference;

determining, from the phonetic database, an alternative pronounceable unit that is specified, by a phonetically equivalent formula of the plurality of phonetically equivalent formulas from the phonetic database, to be phonetically similar to a particular pronounceable unit that is represented within the initial search string;

generating an alternative search string, in the particular language, based at least in part on the initial search string and the alternative pronounceable unit; and performing at least one of: (a) searching a data set for data items that are associated with the alternative search string, and displaying at least one search result that was obtained through the searching, or (b) outputting the alternative search string;

wherein generating the alternative search string comprises generating a search string that contains the initial search string but in which at least one instance of the particular pronounceable unit has been replaced in the initial search string by the alternative pronounceable unit;

wherein the method is performed by one or more self improving phonetic search engines.

2. The method of claim 1, wherein the phonetically equivalent formula comprises a first set of one or more letters that is associated with a second set of one or more letters that (a) differs from the first set and (b) represents the particular pronounceable unit.

3. The method of claim 1, wherein determining the alternative pronounceable unit comprises determining a first sequence of two or more letters that is associated, in a database, with a second sequence of one or more letters that (a) differs from the first sequence and (b) represents the particular pronounceable unit.

4. The method of claim 1, wherein determining the alternative pronounceable unit comprises determining a first set of one or more letters whose pronunciation sounds similar to but not exactly the same as a pronunciation of a second set of one or more letters that (a) differs from the first set and (b) represents the particular pronounceable unit.

5. The method of claim 1, wherein the particular pronounceable unit is represented by less than an entire word within the initial search string.

6. The method of claim 1, further comprising:

in response to receiving the initial search string, determining whether the data set contains any data items that are associated with the initial search string;

wherein the steps of determining the alternative pronounceable unit, generating, searching, and performing are performed in response to a determination that the data set does not contain any data item that is associated with the initial search string.

7. The method of claim 1, further comprising:

in response to receiving the initial search string, determining whether an error memory database contains any previously submitted search strings that are associated with the initial search string;

wherein the steps of determining the alternative pronounceable unit, generating, searching, and performing are performed in response to a determination that the error memory database does not contain any previously submitted search string that is associated with the initial search string.

8. The method of claim 1, wherein determining the alternative pronounceable unit comprises (a) parsing the initial search string into one or more pronounceable units and (b) applying the plurality of phonetically equivalent formulas to the one or more pronounceable units to produce one or more alternative pronounceable units.

9. The method of claim 1, wherein determining the alternative pronounceable unit comprises (a) inputting the initial search string into a text-to-speech processor to obtain a spoken representation of the initial search string, (b) inputting the spoken representation into a speech-to-text processor to obtain one or more alternative search strings that are in a textual form.

10. The method of claim 1, wherein searching the data set for data items that are associated with the alternative search string comprises searching a set of web pages for web pages that contain the alternative search string.

11. The method of claim 1, further comprising:

asking the user from whom the initial search string was received whether the user intended to submit the alternative search string;

wherein the step of performing comprises displaying the alternative search string.

12. The method of claim 1, wherein searching the data set for data items that are associated with the alternative search string comprises searching a set of e-mail messages for e-mail messages that contain the alternative search string.

13. The method of claim 1, further comprising:

in response to an action by the user from whom the initial search string was received, storing an association between the initial search string and the alternative search string in an error memory database.

14. The method of claim 1, wherein searching the data set for data items that are associated with the alternative search string comprises searching a set of computer files for files that are associated with the alternative search string.

15. The method of claim 1, further comprising:

determining a plurality of different alternative search strings based on different pronounceable units that are specified to be phonetically similar to pronounceable units within the initial search string;

determining an initial set of search results based on the initial search string;

determining, for each particular alternative search string in the plurality of different alternative search strings, a separate alternative set of search results based on that particular alternative search string, thereby determining a plurality of alternative sets of search results;

selecting, from among the initial set of search results and the plurality of alternative sets of search results, a selected set of search results; and presenting the selected set of search results to the user from whom the initial search string was received.

16. The method of claim 1, wherein searching the data set for data items that are associated with the alternative search string comprises searching a set of uniform resource locators (URLs) for URLs that contain the alternative search string.

17. The method of claim 1, wherein the initial search string is an initial uniform resource locator (URL), and further comprising:

in response to receiving the initial URL through a browser, determining whether any web page is located at the initial URL;

wherein the steps of determining the alternative pronounceable unit, generating, searching, and performing are performed in response to a determination that there is no web page located at the initial URL.

18. The method of claim 1, further comprising:

asking the user from whom the initial search string was received whether the user intended to submit the alternative search string; and in response to an indication, from the user, that the user intended to submit the alternative search string, storing an association between the initial search string and the alternative search string in an error memory database;

wherein the step of performing comprises displaying the alternative search string.

19. The method of claim 1, further comprising:

in response to the user, from whom the initial search string was received, clicking on at least one search result that was obtained through the searching, storing an association between the initial search string and the alternative search string in an error memory database;

wherein the step of performing comprises displaying at least one search result that was obtained through the searching.

20. The method of claim 1, further comprising:

in response to the user, from whom the initial search string was received, viewing, for at least a specified amount of time, a data item that corresponds to at least one search result that was obtained through the searching, storing an association between the initial search string and the alternative search string in an error memory database;

wherein the step of performing comprises displaying at least one search result that was obtained through the searching.

21. The method of claim 1, further comprising:

asking the user from whom the initial search string was received whether the user intended to submit the alternative search string; and in response to an indication, from the user, that the user did not intended to submit the alternative search string, removing an association between the initial search string and the alternative search string from an error memory database.

22. The method of claim 7, further comprising:

in response to determining that the error memory database contains a previously submitted search string that is associated with the initial search string, using the previously submitted search string as the alternative search string;

wherein the phonetic database comprises the error memory database.

23. The method of claim 13, further comprising:

in response to storing an association between the initial search string and the alternative search string in the error memory database, establishing a new phonetically equivalent formula in the phonetic database;

wherein the new phonetically equivalent formula comprises a first set of one or more letters from the initial search string that is associated with a second set of one or more letters from the alternative search string;

wherein the first set of one or more letters and the second set of one or more letters are different; and wherein the new phonetically equivalent formula represents a particular pronounceable unit.

\* \* \* \* \*